US008515486B2

(12) United States Patent
Miyata

(10) Patent No.: US 8,515,486 B2
(45) Date of Patent: Aug. 20, 2013

(54) WIRELESS COMMUNICATION TERMINAL, WIRELESS COMMUNICATION SYSTEM AND RECORDING MEDIUM RECORDING COMPUTER PROGRAM

(75) Inventor: Katsuya Miyata, Yokohama (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 376 days.

(21) Appl. No.: 12/909,274

(22) Filed: Oct. 21, 2010

(65) Prior Publication Data

US 2011/0092198 A1 Apr. 21, 2011

(30) Foreign Application Priority Data

Oct. 21, 2009 (JP) ................................ 2009-242894

(51) Int. Cl.
*H04M 1/00* (2006.01)
(52) U.S. Cl.
USPC .................. 455/550.1; 455/553.1; 455/422.1; 370/493
(58) Field of Classification Search
USPC ............. 455/422.1, 414.1, 414.4, 425, 456.6, 455/466, 550.1, 552.1, 553.1; 370/493–495, 370/230
See application file for complete search history.

(56) References Cited

U.S. PATENT DOCUMENTS

| | | | | |
|---|---|---|---|---|
| 6,144,848 A * | 11/2000 | Walsh et al. | ............ | 455/419 |
| 6,597,774 B1 * | 7/2003 | Jennings et al. | ......... | 379/114.07 |
| 7,463,888 B2 * | 12/2008 | Sakaniwa | ............ | 455/435.2 |
| 2002/0072397 A1 * | 6/2002 | Asada | ............ | 455/568 |
| 2002/0193143 A1 * | 12/2002 | Miyashita | ............ | 455/556 |
| 2002/0198024 A1 * | 12/2002 | Sakurai | ............ | 455/558 |
| 2003/0179745 A1 * | 9/2003 | Tsutsumi et al. | ............ | 370/352 |
| 2005/0195803 A1 * | 9/2005 | Hosokubo | ............ | 370/352 |
| 2005/0266851 A1 * | 12/2005 | Kouno | ............ | 455/436 |
| 2005/0288054 A1 * | 12/2005 | Sakaniwa | ............ | 455/550.1 |
| 2008/0108331 A1 * | 5/2008 | Jin et al. | ............ | 455/414.1 |
| 2008/0144828 A1 * | 6/2008 | Rofougaran | ............ | 380/270 |
| 2008/0176557 A1 * | 7/2008 | Hellstrom et al. | ............ | 455/425 |
| 2010/0190483 A1 * | 7/2010 | Imukai et al. | ............ | 455/418 |
| 2010/0255870 A1 * | 10/2010 | George | ............ | 455/518 |
| 2012/0009942 A1 * | 1/2012 | Zoubir | ............ | 455/456.1 |

FOREIGN PATENT DOCUMENTS

JP 2007-096923 4/2007

OTHER PUBLICATIONS

3GPP TS 23.272 V8.4.0 (Jun. 2009), 3rd Generation Partnership Project; Technical Specification Group Services and System Aspects; Circuit Switched Fallback in Evolved Packet System; Stage 2 (Release 8).

* cited by examiner

*Primary Examiner* — Dominic E Rego
(74) *Attorney, Agent, or Firm* — Young & Thompson

(57) ABSTRACT

A wireless communication terminal has a first wireless communication unit which performs data communication via a first wireless communication system and a second wireless communication unit which performs voice communication via a second wireless communication system. When an instruction of starting a voice communication is given, a temporal withdrawal process is started to the first wireless communication system, and an acquiring process of the second wireless communication system is started. After the voice communication ends, until a predetermined time elapses, an acquiring state of the second wireless communication system by the second wireless communication unit is continued. After the predetermined time has elapsed, the acquiring state of the second wireless communication system is cancelled, and a temporal withdrawal cancelling process is started to the first wireless communication system.

13 Claims, 10 Drawing Sheets

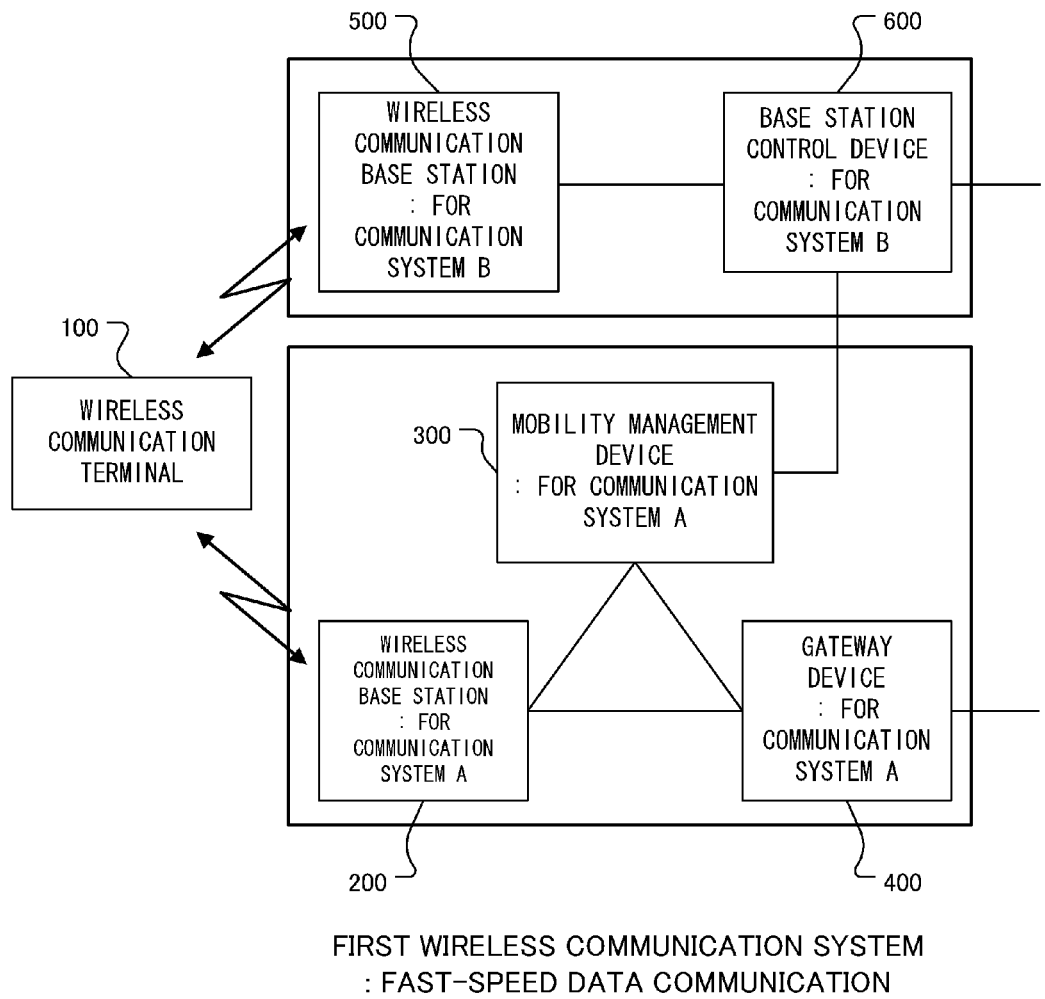

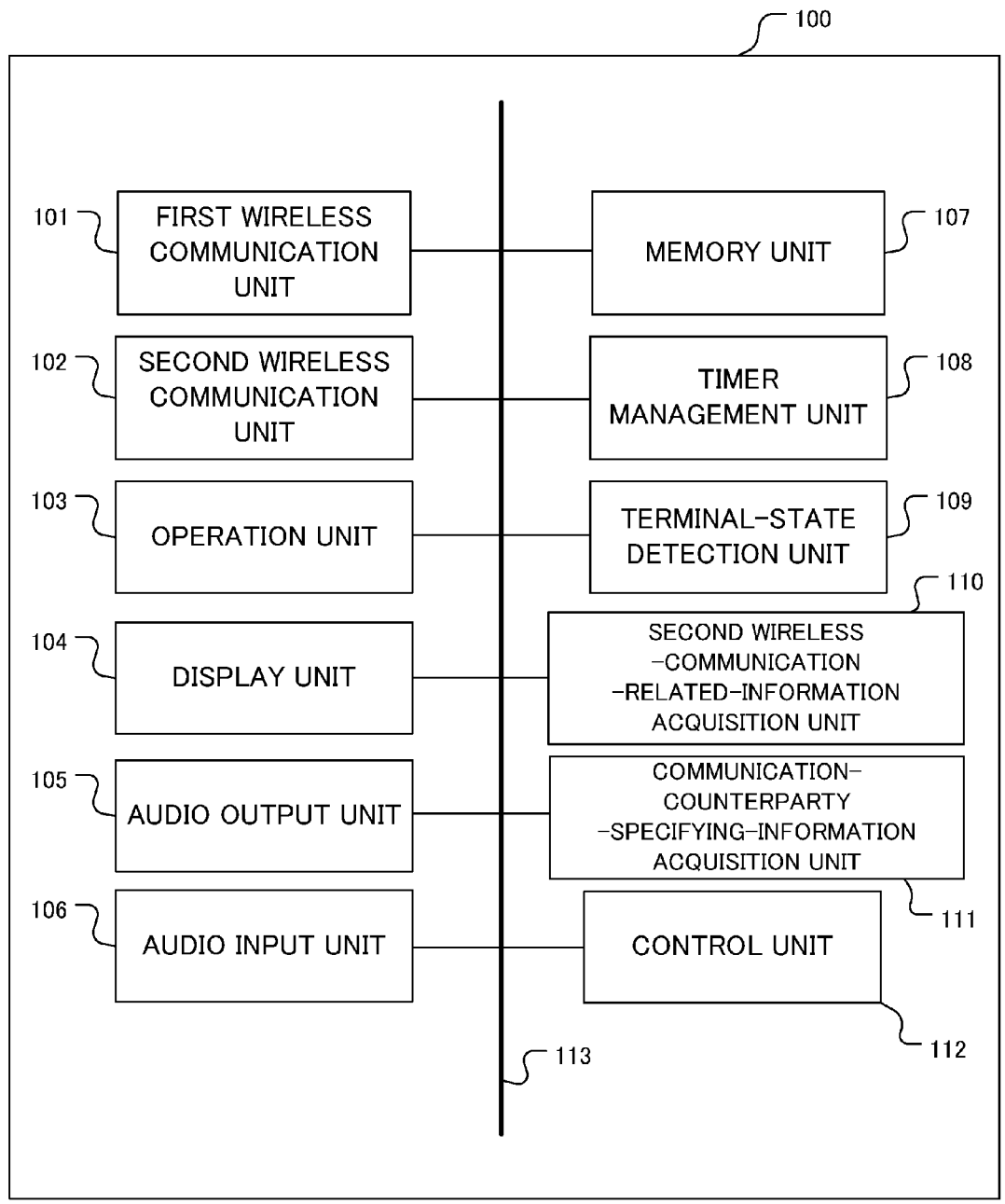

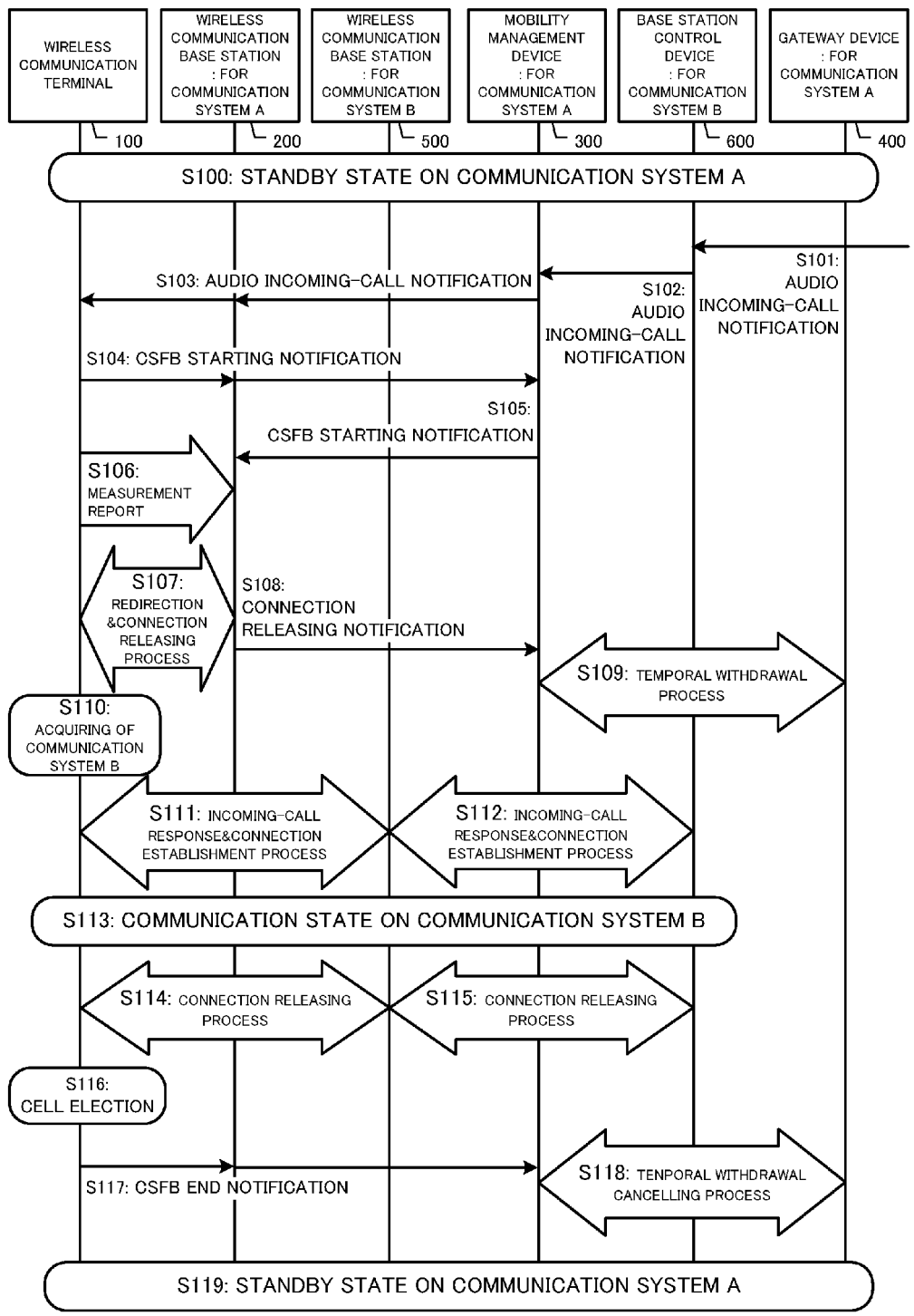

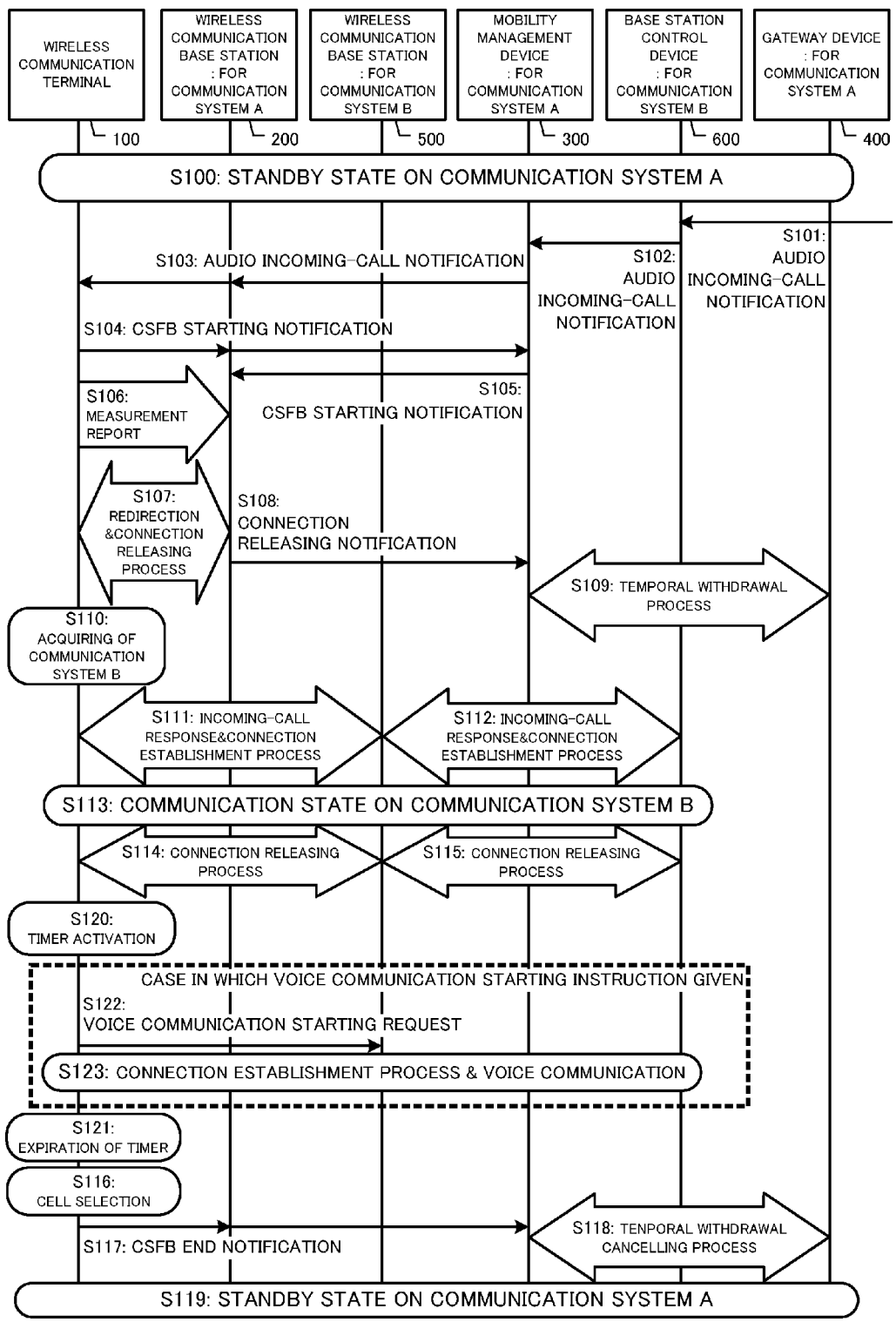

WIRELESS COMMUNICATION TERMINAL, WIRELESS COMMUNICATION SYSTEM AND RECORDING MEDIUM RECORDING COMPUTER PROGRAM

INCORPORATION BY REFERENCE

This application is based on Japanese Patent Application No. 2009-242894 filed on Oct. 21, 2009 and including specification, claims, drawings and summary. The disclosure of the above Japanese Patent Application is incorporated herein by reference in its entirety.

TECHNICAL FIELD

The present invention relates to a wireless communication terminal and a wireless communication system which can cope with equal to two or more wireless communication schemes and a recording medium recording a computer program.

BACKGROUND ART

As a next-generation high speed wireless communication scheme (or, a next-generation high speed wireless communication system), development of an LTE (Long Term Evolution) is currently advancing. The LTE has a wide bandwidth of 20 MHz at maximum, adopts OFDMA (Orthogonal Frequency Division Multiple Access) and MIMO (Multiple Input Multiple Output) for download traffic, and adopts SC-FDMA (Single-Carrier Frequency Division Multiple Access), etc., for upload traffic, so as to realize the download traffic of over 300 Mbps at maximum and the upload traffic of 75 Mbps at maximum.

Because the LTE is a communication scheme specialized in a packet communication, it is assumed that conventional communication schemes, such as W-CDMA and cdma2000 1x, are utilized for a voice communication through circuit switching even if a wireless communication terminal can utilize the LTE. In wireless communication terminals which always stand by for both wireless communication system for voice communication and LTE system, a current consumed in a normal standby mode of the wireless communication terminals is large. In wireless communication terminals which stand by only for the LTE system, an incoming call cannot be received in a normal mode, so that a function as a so-called "telephone" cannot be held. In wireless communication terminals which stand by for only the wireless communication system for voice communication, it is not possible to make use of an advantage which is the continuous IP connectivity of the LTE.

In order to overcome such problems, a function called a CS (Circuit Switched) Fallback has been thought out for the LTE system. According to the CS Fallback, an audio incoming-call notification from the wireless communication system for voice communication, such as W-CDMA or cdma2000 1x, is transmitted to a wireless communication terminal by tunneling over the LTE system. The wireless communication terminal which received the audio incoming-call notification performs a temporal withdrawal (Suspend) process on the LTE system, performs a connection establishing process on the wireless communication system for voice communication, and executes a voice communication. When the voice communication ends, the wireless communication terminal performs a connection releasing process on the wireless communication system for voice communication, performs a temporal withdrawal cancelling (Resume) process on the LTE system, and returns to a mode of standing by for the LTE system. The operation of the CS Fallback is not limited to the audio incoming-call receiving process, and is the same operation in the case of an audio outgoing-call (origination-call) transmitting process.

As explained above, the wireless communication terminals which adopt an LTE that can normally stand by only for the LTE system can reduce a current consumption in comparison with the wireless communication terminals which adopt an LTE that can stand by for both wireless communication system for voice communication and LTE system. In addition, the wireless communication terminals which adopt the LTE that can stand by only for the LTE system also has an advantage of receiving an incoming call (see, for example, Non-patent Literature: 3GPP TS 23.272 V8.4.0 (2009-06), "3rd Generation Partnership Project; Technical Specification Group Services and System Aspects; Circuit Switched Fallback in Evolved Packet System; Stage 2 (Release 8)").

However, according to the conventional wireless communication terminals employing the LTE, when an audio incoming call or an audio outgoing call is made successively in a short period, e.g., when a user makes redialing immediately after a communication started by an audio incoming call ends or when the user immediately makes a call to a communication counterparty because another communication counterparty did not respond although an audio call transmitting process has been performed, the temporal withdrawal process of the LTE system and the temporal withdrawal cancelling process thereof are both activated, bringing about a problem that a transmitting process takes time. Moreover, according to the conventional wireless communication terminals employing the LTE, a control message for the temporal withdrawal cancelling process and a control message for the temporal withdrawal process are exchanged over radio in a short period, bringing about a problem that radio resources are wasted.

Furthermore, the similar problems to the foregoing problems generally happen in wireless communication terminals each having a first wireless communication unit which performs data communication on a first wireless communication scheme and a second wireless communication unit which communicates in a second wireless communication scheme enabling a voice communication.

SUMMARY

The present invention has been made in view of the foregoing problems, and it is an exemplary object of the present invention to provide a wireless communication terminal and a wireless communication system which can avoid taking a long time for a voice communication process when successively performing voice communication processes and which can suppress any wasting of a wireless resource, and a recording medium recording a computer program.

To achieve the foregoing exemplary object, a wireless communication terminal according to a first exemplary aspect of the present invention comprising:

a first wireless communication unit which performs data communication via a first wireless communication system in a first wireless communication scheme;

a second wireless communication unit which performs voice communication via a second wireless communication system in a second wireless communication scheme enabling a voice communication; and a control unit which controls the first wireless communication unit and the second wireless communication unit, wherein the control unit causes the first wireless communication unit to execute a temporal withdrawal process to the first wireless communication system, and causes the second wireless communication unit to execute an acquiring process of the second wireless communication system when an instruction of starting a voice communication is given, and causes the second wireless communication unit to continue an acquiring state of the second wireless communication system when a predetermined condition is satisfied after the voice communication ends.

To achieve the foregoing exemplary object, a wireless communication terminal according to a second exemplary aspect of the present invention comprising:

first wireless communication means for performing data communication via a first wireless communication system in a first wireless communication scheme;

second wireless communication means for performing voice communication via a second wireless communication system in a second wireless communication scheme enabling a voice communication; and control means for controlling the first wireless communication means and the second wireless communication means, wherein the control means causes the first wireless communication means to execute a temporal withdrawal process to the first wireless communication system, and causes the second wireless communication means to execute an acquiring process of the second wireless communication system when an instruction of starting a voice communication is given, and causes the second wireless communication means to continue an acquiring state of the second wireless communication system when a predetermined condition is satisfied after the voice communication ends.

To achieve the foregoing exemplary object, a wireless communication system according to a third exemplary aspect of the present invention comprising a first wireless communication system which performs data communication, a second wireless communication system which performs voice communication, and a wireless communication terminal, the wireless communication terminal starting a temporal withdrawal process to the first wireless communication system before performing voice communication on the second wireless communication system when an instruction of starting the voice communication is given, and the wireless communication terminal starting a temporal withdrawal cancelling process to the first wireless communication system after the voice communication ends, wherein when a predetermined condition is satisfied, the wireless communication terminal does not start the temporal withdrawal cancelling process to the first wireless communication system, and when the instruction of starting the voice communication is given during such operation, the wireless communication terminal starts a voice communication process to the second wireless communication system.

To achieve the foregoing exemplary object, a recording medium recording a computer program according to a fourth exemplary aspect of the present invention records a computer program which controls an operation of a computer comprising a first wireless communication unit which performs data communication via a first wireless communication system and a second wireless communication unit which performs voice communication via a second wireless communication system, wherein the program causes the computer to execute:

a temporal withdrawal process to the first wireless communication system and an acquiring process of the second wireless communication system when an instruction of starting the voice communication is given; and a process of continuing an acquiring state of the second wireless communication system when a predetermined condition is satisfied after the voice communication ends.

According to the wireless communication terminal, the wireless communication system and the recording medium recording the computer program of the present invention, it becomes possible to make a voice communication process time shorter than those of conventional technologies when the voice communication process is successively performed. Moreover, according to the wireless communication terminal, the wireless communication system and the recording medium recording the computer program of the present invention, any wasting of wireless resources can be suppressed.

BRIEF DESCRIPTION OF THE DRAWINGS

These objects and other objects and advantages of the present invention will become more apparent upon reading of the following detailed description and the accompanying drawings in which:

FIG. 1 is a diagram showing a configuration of a wireless communication system according to a first embodiment of the present invention;

FIG. 2 is a diagram showing a configuration of the wireless communication terminal shown in FIG. 1;

FIG. 3 is a conceptual diagram showing a process flow of a conventional CSFB process;

FIG. 5 is a conceptual diagram showing a process flow of the wireless communication system according to the first embodiment of the present invention;

EXEMPLARY EMBODIMENTS

Figure 4A:
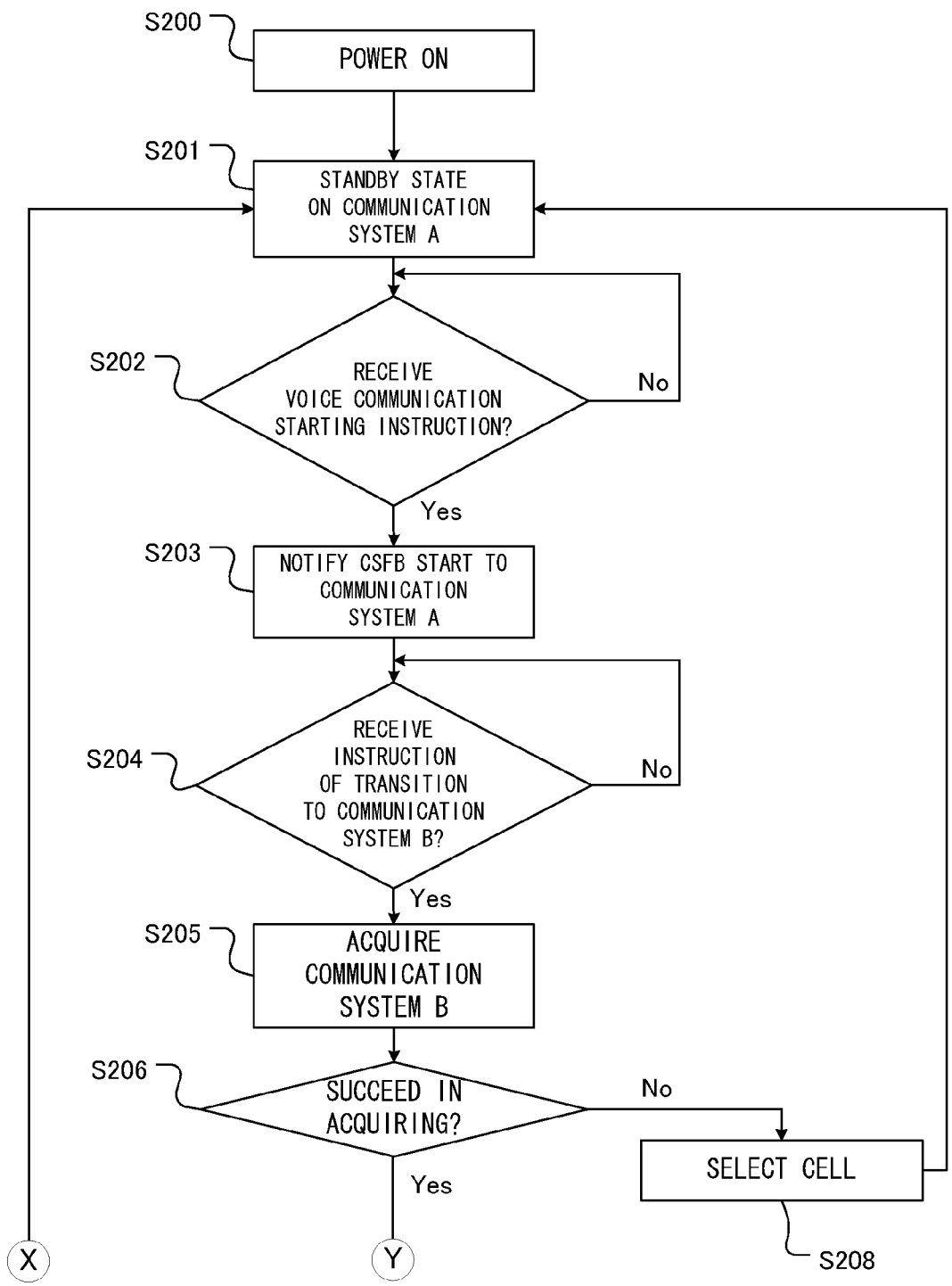
FIG. 4A is a flowchart showing a process flow of the wireless communication terminal according to the first embodiment of the present invention.

An explanation will be given of a wireless communication terminal and a wireless communication system according to embodiments of the present invention.

First Embodiment

Entire System Configuration

As shown in FIG. 1, a wireless communication system 10 of a present embodiment comprises a wireless communication terminal 100, a wireless communication base station 200, a mobility management device 300, a gateway device 400, a wireless communication base station 500, and a base station control device 600.

The wireless communication base station 200, the mobility management device 300, and the gateway device 400 are network devices configuring a first wireless communication system (hereinafter, a communication system A). The communication system A supports communication schemes, such as LTE, HSPA (High Speed Packet Access), EV-DO, and WiMAX, and mainly provides a high-speed data communication service. Note that in addition to the foregoing devices, an authentication server, a subscriber information management server, a policy/charging control server, etc., may be included although those devices are not illustrated in the figure.

The wireless communication base station 500 and the base station control device 600 are network devices configuring a second wireless communication system (hereinafter, a communication system B). The communication system B supports communication schemes, such as W-CDMA, cdma2000 1x, PHS (Personal Handyphone System), and mainly provides a voice communication service. In addition to the voice communication service, there is also a case in which the communication system B provides a data communication service. Note that in addition to the foregoing devices, an authentication server, a subscriber information management server, a policy/charging control server, etc., may be included although those devices are not illustrated in the figure.

The wireless communication base station 200 performs wireless communication (mainly high-speed data communication) with the wireless communication terminal 100 in a home area (cell) via a wireless interface. For example, in a case of an LTE system, an eNB (evolved Node B) corresponds to the wireless communication base station 200.

The mobility management device 300 has such functions as management of position information on the wireless communication terminal 100, management of sessions, and management of a gateway device to be connected. For example, in the case of the LTE system, an MME (Mobility Management Entity) corresponds to the mobility management device 300.

The gateway device 400 has such functions as transferring data communication traffic, and shifting data transferring paths at the time of handover. For example, in the case of the LTE system, an S-GW (Serving Gateway) corresponds to the gateway device 400.

The wireless communication base station 500 performs wireless communication (mainly voice communication) with the wireless communication terminal 100 in a home area (cell) via a wireless interface. For example, a Node B, a BTS (Base Transceiver Station), and a BS (Base Station) correspond to the wireless communication base station 500.

The base station control device 600 performs, for example, registration of a position of the wireless communication terminal 100, authentication, call transmitting/receiving process, and handover control. For example, an RNC (Radio Network Control), an MSC (Mobile Switching Center) correspond to the base station control device 600.

The wireless communication system 10 shown in FIG. 1 is configured to have an interconnectivity that enables the communication system A and the communication system B to be connected together as the base station control device 600 and the mobility management device 300 are connected together. In FIG. 1, although both devices are directly connected together, a device like a CS IWS (Circuit Switched fallback Interworking Solution function) may be present between both devices.

Conversely, the wireless communication terminal 100 is configured to cope with the communication system A and the communication system B and to perform wireless communication with the wireless communication base station 200 and the wireless communication base station 500. An explanation will now be given of the detailed configuration with reference to FIG. 2.

FIG. 2 is a diagram showing a configuration of the wireless communication terminal 100.

As shown in FIG. 2, the wireless communication terminal 100 includes a first wireless communication unit 101, a second wireless communication unit 102, an operation unit 103, a display unit 104, an audio output unit 105, an audio input unit 106, a memory unit 107, a timer management unit 108, a terminal-state detection unit 109, a second wireless-communication-related-information acquisition unit 110, a communication-counterparty-specifying-information acquisition unit 111, a control unit 112, and a bus 113.

The first wireless communication unit 101 supports the communication system A, and exchanges various kinds of data via the wireless communication base station 200. Moreover, the first wireless communication unit 101 performs wireless communication based on a wireless communication scheme, such as the LTE, the HSPA, the EV-DO, or the WiMAX.

The second wireless communication unit 102 supports the communication system B, performs voice communication, and exchanges various kinds of data via the wireless communication base station 500. Moreover, the second wireless communication unit 102 performs wireless communication based on a wireless communication scheme, such as the W-CDMA, the cdma2000 1x, or the PHS.

The operation unit 103 has a keyboard, a cursor pad, a numerical keypad, etc., receives an operation given by a user, and inputs an operation signal to the control unit 112.

The display unit 104 is configured by a display panel like a dot-matrix-type LCD (Liquid Crystal Display) panel, a driver circuit and the like. The display panel 104 displays arbitrary data (e.g., a letter, an image, and a screen image) under the control of the control unit 112.

The audio output unit 105 has a speaker, a DAC (Digital Analog Converter) and the like, performs D/A conversion on an audio signal received from, for example, the second wireless communication unit 102, and causes the speaker to output sound.

The audio input unit 106 has a microphone and the like, collects audio signals at the time of communication, and supplies such audio signals to the second wireless communication unit 102.

The memory unit 107 comprises a memory built in the wireless communication terminal 100, a detachable external memory, etc., and stores various kinds of programs and data. For example, the memory unit 107 stores an operation control program for the control unit 112. Moreover, the memory unit 107 stores a name of a communication counterparty, a telephone number thereof, an e-mail address thereof, other attribute information thereof and the like, in association with one another as a telephone book.

The timer management unit 108 is configured by, for example, a software timer, and determines whether or not a predetermined time has elapsed by measuring an elapsed time from a certain time point under the control of the control unit 112.

The terminal-state detection unit 109 indirectly detects any action of denying the possibility of re-communication by the user after a voice communication ends. More specifically, the terminal-state detection unit 109 is configured by any one of or a combination of a switch which detects a closed state of the wireless communication terminal 100 (when the wireless communication terminal 100 is an openable/closable cellular phone, etc.), an optical sensor which detects surrounding brightness, an acceleration sensor which detects a vibration of the wireless communication terminal 100 and a direction thereof, and a program which acquires startup statuses of respective various applications of the wireless communication terminal 100.

The open/closed state detection switch detects, for example, a state in which the wireless communication terminal 100 is folded so that a voice communication is difficult when the wireless communication terminal 100 is a foldable type, and detects a state in which two housings are overlapped so that a voice communication is difficult when the wireless communication terminal 100 is a slide type.

Moreover, the optical sensor detects that brightness around the wireless communication terminal 100 becomes equal to a reference level or lower (the surrounding area becomes dark).

The acceleration sensor detects a vibration of the wireless communication terminal 100 and a direction thereof.

The startup detection program detects that an application program of the wireless communication terminal 100 is launched.

The second wireless-communication-related-information acquisition unit 110 acquires information related to a wireless communication performed by the second wireless communication unit 102. The information related the wireless communication performed by the second wireless communication unit 102 is, for example, communication-counterparty information, e.g., a name of a communication counterparty (communication destination) whom the user is communicating, a telephone number thereof, identification information thereof, a time taken by the communication, and a reason for communication termination. Those pieces of information are acquired by reading from the memory unit 107, monitoring a communication by the second wireless communication unit 102, being subjected to notification by the base station control device 600 via the wireless communication base station 500, and so on.

The communication-counterparty-specifying-information acquisition unit 111 has any one of or a combination of, for example, a function of accessing the telephone book stored in the memory unit 107 of the wireless communication terminal 100, a function of receiving an input of an outgoing-call telephone number through a user operation, and a function of accessing a telephone number database on the Web.

The control unit 112 is configured by a micro processor unit and the like, runs the operation control program stored in the memory unit 107, and controls the entire operation of the wireless communication terminal 100.

The bus 113 mutually exchanges data among each of the units 101 to 112 shown in FIG. 2.

<Flow of Conventional CSFB Process>

Next, an explanation will be given of an operation of a conventional CS Fallback (hereinafter, CSFB) function with reference to FIG. 3. Note that as a configuration of a wireless communication system and a functional configuration of a wireless communication terminal are same as those shown in FIG. 1 and FIG. 2, respectively, the duplicated explanation thereof will be omitted.

As an initial state, the wireless communication terminal 100 is in a standby state on the communication system A (S100). The standby state means a state in which the wireless communication terminal 100 has completed a synchronization process to a cell (or a wireless base station) belonging to the communication system A, and has received system information which is notified in that cell and which is related to the communication system A, and is so-called a "camp on" state. Moreover, in the standby state, there is also a case in which the wireless communication terminal 100 requests the network devices (the mobility management device 300 and the gateway device 400) of the communication system A to execute a position registration process, a session (Session) or bearer (Bearer) establishment process, etc. As the wireless communication terminal 100 is generally in the standby state on the communication system A, it is advantageous such that the startup time of a data communication becomes fast and the network side can activate a service to the wireless communication terminal 100.

In the state of step S100, when a communication counterparty (not illustrated) performs an audio outgoing-call transmitting process to the wireless communication terminal 100, an audio incoming-call notification addressed to the wireless communication terminal 100 is transmitted to the base station control device 600 of the communication system B (S101). The base station control device 600 transmits the audio incoming-call notification addressed to the wireless communication terminal 100 to the mobility management device 300 of the communication system A across the communication systems A and B (S102). The mobility management device 300 transmits the audio incoming-call notification addressed to the wireless communication terminal 100 to the wireless communication terminal 100 via the wireless communication base station 200 (S103). In steps S102 and S103, the audio incoming-call notification of the communication system B is transmitted by tunneling on a control message of the communication system A.

The wireless communication terminal 100 which received the audio incoming-call notification transmits a CSFB starting notification to the mobility management device 300 via the wireless communication base station 200 (S104). The mobility management device 300 transmits the CSFB starting notification to the wireless communication base station 200 (S105).

The wireless communication terminal 100 regularly measures a reception condition of a standby cell and a reception condition of a neighbor cell, and reports a result of the measurement to the wireless communication base station 200 (S106). Examples of the reception condition are RSSI (Received Signal Strength Indicator), RSRP (Reference Signal Received Power), RSRQ (Reference Signal Received Quality). The foregoing measurement and the foregoing result report are basically operations which are steadily performed regardless of the presence/absence of an audio incoming-call notification. However, the reception of the audio incoming-call notification may be a trigger of starting the process.

The wireless communication base station 200 which received the measurement result report transmitted by the wireless communication terminal 100 notifies a redirection instruction to the wireless communication terminal 100, and launches a connection releasing process (S107). The wireless communication base station 200 sets a destination of the redirection and a redirection timing in accordance with contents of the measurement result report. In the connection releasing process, each of the wireless communication terminal 100 and the wireless communication base station 200 releases a wireless resource stored for a wireless communication between both devices, and eliminates related management information and the like. If needed, a control message is exchanged between both devices.

When completing the connection releasing process, the wireless communication base station 200 transmits a connection releasing notification to the mobility management device

300 (S108). The mobility management device 300 which received the connection releasing notification executes a temporal withdrawal (suspend) process to the gateway device 400 (S109). In the temporal withdrawal process, the mobility management device 300 and the gateway device 400 partially release or temporarily stop communication resources stored for transmitting data addressed to the wireless communication terminal 100, and partially eliminate related management information and the like. If needed, a control message is exchanged between both devices. Moreover, a buffering function of the data addressed to the wireless communication terminal 100 may be made effective. In either case, as the communication resources and the management information are not completely released and completely eliminated, a communication can resume in a short time in a later temporal withdrawal cancelling process.

The wireless communication terminal 100 which executed the connection releasing process in step S107 executes an acquiring process of the communication system B (S110). At this time, the wireless communication terminal 100 sets the wireless communication base station 500 to be acquired by searching all cells on the communication system B or by following the redirection instruction in step S107.

Next, the wireless communication terminal 100 executes an incoming-call response process and a connection establishment process to the acquired wireless communication base station 500 of the communication system B (S111). The wireless communication base station 500 executes an incoming-call response process and a connection establishment process with the base station control device 600 (S112).

When the processes in the respective steps S111 and S112 complete, the wireless communication terminal 100 becomes able to perform voice communication over the communication system B (S113).

When the voice communication ends, the wireless communication terminal 100 executes a connection releasing process with the wireless communication base station 500 (S114). Moreover, the wireless communication base station 500 executes a connection releasing process with the base station control device 600 (S115). The communication system B is basically linked to a status of storing of a wireless resource between the wireless communication terminal 100 and the wireless communication base station 500, and has communication resources necessary for the wireless communication base station 500 and the base station control device 600. Accordingly, the communication system B basically does not have a function of a temporal withdrawal process of leaving communication resources only to the wireless communication base station 500 and the base station control device 600 or of a temporal withdrawal cancelling process.

The wireless communication terminal 100 which completed the connection releasing process searches a cell on the communication system A and selects a cell where the wireless communication terminal 100 stands by (S116). The wireless communication terminal 100 transmits a CSFB end notification to the mobility management device 300 via the wireless communication base station 200 of the selected cell (S117). The mobility management device 300 which received the CSFB end notification executes the temporal withdrawal cancelling (resume) process to the gateway device 400 (S118). In the temporal withdrawal cancelling process, the mobility management device 300 and the gateway device 400 store again or resume the communication resources which have been partially released or temporarily stopped in the step S109, and re-establish the partially-eliminated management information. If needed, a control message is exchanged between both devices. Moreover, transferring of the data which is subjected to buffering to the wireless communication terminal 100 can be started to the wireless communication terminal 100. Thereafter, the wireless communication terminal 100 becomes a standby state on the communication system A (S119).

The foregoing process is the flow of the conventional CSFB process at the time of an audio incoming call. Regarding a flow of a CSFB process at the time of an audio outgoing call, like the flow at the time of an audio incoming call, a temporal withdrawal process is executed to the gateway device 400 before the communication system B is acquired, and a temporal withdrawal cancelling process is executed to the gateway device 400 by reacquiring the communication system A after a voice communication on the communication system B ends.

<Flow of Process by Wireless Communication Terminal 100 According to First Embodiment>

Next, an explanation will be given of a process by the wireless communication terminal 100 according to the first embodiment with reference to FIGS. 4A and 4B.

Figure 4B:
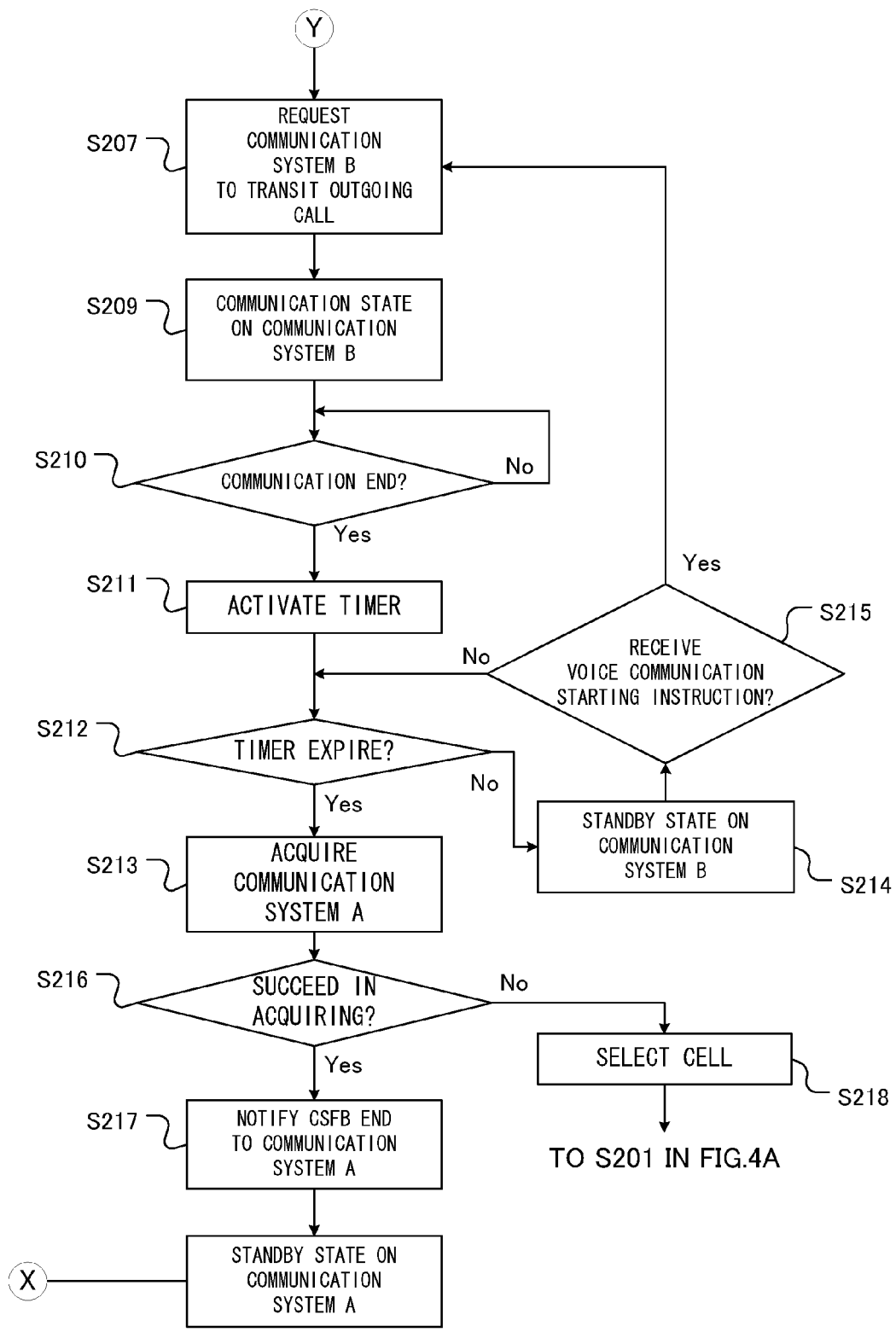
FIG. 4B is a flowchart showing a process flow of the wireless communication terminal according to the first embodiment of the present invention.

Note that each step shown in FIGS. 4A and 4B are executed under the control of the control unit 112 as the control unit 112 runs the operation control program stored in the memory unit 107.

When the power of the wireless communication terminal 100 is turned on (S200), the control unit 112 controls the first wireless communication unit 101 to acquire the communication system A. The first wireless communication unit 101 becomes a standby state on the communication system A (S201). At this time, an acquiring process of the communication system B and a reception condition measurement are not executed by the second wireless communication unit 102. In this state, when a voice communication starting instruction is received (S202; Yes), the control unit 112 transmits a CSFB starting notification to the communication system A (i.e., to the wireless communication base station 200) via the first wireless communication unit 101 (S203). Conversely, when the voice communication starting instruction has not been received (S202; No), the control unit 112 stands by until the voice communication starting instruction is received (S202). Note that the voice communication starting instruction is an audio incoming-call notification from another terminal device similar to the step S103 in FIG. 3, or a starting instruction of an audio outgoing-call transmitting process given by the control unit 112 as a user operates the operation unit 103 to perform an outgoing-call transmitting operation. Moreover, the CSFB starting notification in the step S203 is same as the CSFB starting notification in the step S104 in FIG. 3.

After transmitting the CSFB starting notification in step S203, the control unit 112 stands by for receiving a transition instruction to the communication system B from the wireless communication base station 200 on the communication system A via the first wireless communication unit 101 (S204). This step corresponds to the redirection instruction in step S107 in FIG. 3. When the first wireless communication unit 101 receives the transition instruction to the communication system B (S204; Yes), the control unit 112 causes the second wireless communication unit 102 to execute an acquiring process of the communication system B (S205). That is, a process of acquiring the wireless communication base station 500 is executed. This step corresponds to step S110 in FIG. 3. When acquiring of a cell of the communication system B becomes successful (S206; Yes), the control unit 112 transmits an outgoing-call transmitting request to that cell via the second wireless communication unit 102 (S207). This step corresponds to the process of step S111 in FIG. 3. Conversely, when acquiring of the cell of the communication system B is failed (S206; No), the control unit 112 causes the first wireless communication unit 101 to newly perform cell selection on the communication system A (S208), and returns to the state in step S201.

After executing step S207, the wireless communication terminal 100 becomes a communication state on the communication system B under the control of the control unit 112 (S209). This step corresponds to step S113 in FIG. 3.

When the wireless communication terminal 100 completes the communication on the communication system B (S210; Yes), the timer management unit 108 causes a timer to start measuring (S211). For example, when the user operates the operation unit 103 to give an instruction of a communication end, when an instruction of disconnection of a communication is given from the communication system B, or when a strength of a radio wave received from the wireless communication base station 500 of the communication system B becomes equal to a reference value or less so that a communication is disconnected, the control unit 112 responds to a notification of a communication disconnection and the like from the second wireless communication unit 102, and controls the timer management unit 108 to start clocking.

When a predetermined time has elapsed and the timer expires (S212; Yes), the timer management unit 108 sends a notification to that effect to the control unit 112. The control unit 112 responds to the notification, and controls the first wireless communication unit 101 to execute an acquiring process of the communication system A (S213). This step corresponds to step S116 in FIG. 3. Note that the predetermined time is set to be a length which can be expected that the possibility of the user performing again an outgoing-call transmitting operation is high, and is set to be, for example, 30 seconds.

When acquiring of a cell of the communication system A succeeds (S216; Yes), the control unit 112 controls the first wireless communication unit 101 to transmit a CSFB end notification to that cell (S217). This step corresponds to step S117 in FIG. 3. When the foregoing processes complete, the first wireless communication unit 101 returns to the standby state on the communication system A (S201). This step corresponds to step S119 in FIG. 3. When acquiring of the cell of the communication system A is failed in step S216 (S216; No), the control unit 112 controls the first wireless communication unit 101 and the second wireless communication unit 102 to newly select cells on all wireless communication systems (S218). When the communication system A can be acquired, the control unit 112 returns to the state in the step S201. When the communication system A cannot be acquired, the control unit 112 executes an acquiring process of the communication system B or executes an out-of-service sleep process (not illustrated). Note that when a voice communication starting instruction is received successively, the foregoing processes are repeated.

When it is determined in step S212 that the timer has not expired (S212; No), the wireless communication terminal 100 maintains a standby state on the communication system B (S214). When receiving a voice communication starting instruction (S215; Yes), the control unit 112 returns the control to step S207, and transmits an outgoing-call transmitting request to the cell of the communication system B via the second wireless communication unit 102. Conversely, when no voice communication starting instruction is received (S215; No), the process returns to the process of determining whether or not the timer has expired (S212).

As explained above, the wireless communication terminal 100 of the present embodiment does not immediately transition the process to the acquiring process of the communication system A after the voice communication on the communication system B ends, but maintains the acquiring state of the communication system B when a certain condition, i.e., when it is within the predetermined time is satisfied, and then transitions the process to the acquiring process of the communication system A. By employing such process procedures, when an outgoing-call transmitting operation is given by the user during the predetermined time after a voice communication ends, an outgoing-call transmitting request can be transmitted to the communication system B without the processes from step S203 to step S206 which are requisite in the case of the conventional technologies. Accordingly, a time until a voice communication starts can be shortened. Moreover, during such operation, it is not necessary to transmit the CSFB end notification in step S217 and the CSFB starting notification in step S203, so that a wireless resource can be also saved.

<Flow of Process by Wireless Communication System 10>

Next, an explanation will be given of a process flow of the wireless communication system 10 according to the first embodiment with reference to FIG. 5. The present process flow is mostly same as that in FIG. 3, and the process corresponding to the same process in FIG. 3 will be denoted by the same reference numeral.

Operations from the step S100 to the step S115 are same as the processes in FIG. 3. That is, as an initial state, the wireless communication terminal 100 is in a standby state on the communication system A (S100). In the standby state (S100), when a communication counterparty performs an audio outgoing-call transmitting process to the wireless communication terminal 100, the audio incoming-call notification addressed to the wireless communication terminal 100 is transmitted to the base station control device 600 of the communication system B (S101). The base station control device 600 transmits the audio incoming-call notification addressed to the wireless communication terminal 100 to the mobility management device 300 of the communication system A across the communication systems A and B (S102). The mobility management device 300 transmits the audio incoming-call notification addressed to the wireless communication terminal 100 to the wireless communication terminal 100 via the wireless communication base station 200 (S103).

The wireless communication terminal 100 which received the audio incoming-call notification transmits a CSFB starting notification to the mobility management device 300 via the wireless communication base station 200 (S104). The mobility management device 300 transmits the CSFB starting notification to the wireless communication base station 200 (S105).

The wireless communication terminal 100 regularly measures a reception condition of a standby cell and a reception condition of a periphery cell, and reports a result of the measurement to the wireless communication base station 200 (S106).

The wireless communication base station 200 which received the measurement result report transmitted by the wireless communication terminal 100 notifies a redirection instruction to the wireless communication terminal 100, and launches a connection releasing process (S107).

When completing the connection releasing process, the wireless communication base station 200 transmits a connection releasing notification to the mobility management device 300 (S108). The mobility management device 300 which received the connection releasing notification executes a temporal withdrawal (suspend) process to the gateway device 400 (S109). In the temporal withdrawal process, the mobility management device 300 and the gateway device 400 partially release or temporarily stop communication resources stored for transmitting data addressed to the wireless communication terminal 100, and partially eliminate related management information and the like.

The wireless communication terminal 100 which executed the connection releasing process in step S107 executes an acquiring process of the communication system B (S110).

Next, the wireless communication terminal 100 executes an incoming-call response process and a connection establishment process to the acquired wireless communication base station 500 of the communication system B (S111). The wireless communication base station 500 executes an incoming-call response process and a connection establishment process with the base station control device 600 (S112).

When the processes in the respective steps S111 and S112 complete, the wireless communication terminal 100 becomes able to perform voice communication over the communication system B (S113).

When the voice communication ends, the wireless communication terminal 100 executes a connection releasing process with the wireless communication base station 500 (S114). Moreover, the wireless communication base station 500 executes a connection releasing process with the base station control device 600 (S115).

When the voice communication ends, and a connection between the wireless communication terminal 100 and the wireless communication base station 500 and a connection between the wireless communication base station 500 and the base station control device 600 are released in steps S114 and S115, respectively, the timer management unit 108 of the wireless communication terminal 100 activates the timer (S120). This step corresponds to the step S211 in FIG. 4B. When a predetermined time has elapsed as it is and the timer expires (S121), the process transitions to the standby cell selection process in step S116. Until the timer expires, the wireless communication terminal 100 maintains the standby state on the communication system B. Subsequent operations from step S117 to step S119 are same as the processes in FIG. 3. In the state at S119, when a new voice communication starting instruction is given to the wireless communication terminal 100, a sequence of the processes from step S104 to step S110 are repeated, and the process transitions to a voice communication process.

However, when the new voice communication starting instruction is given to the wireless communication terminal 100 before the timer expires in step S121 (corresponding to S215; Yes in FIG. 4B), the wireless communication terminal 100 issues a voice communication starting request to the wireless communication base station 500 (S122), and executes a connection establishment process and a voice communication process (S123). Thereafter, when the timer expires (S121), processes same as the processes from step S116 to step S119 shown in FIG. 3 are executed.

Through the foregoing processes, a time until a voice communication starts can be shortened when voice communication operation is successively performed, and the user-friendliness of the wireless communication system can be improved. Moreover, during such operation, it becomes unnecessary to transmit the CSFB end notification in the step S117 and the CSFB starting notification in step S104, so that a wireless resource can be also saved.

Note that the operation unit 103 may be set so as to allow a user to set and store the "predetermined time" subjected to measurement by the timer in the memory unit 107 or the like. In this case, the control unit 112 reads a time stored in the memory unit 107 in step S211, and the timer management unit 108 sets the read time in the timer.

Moreover, the control unit 112 may clock and record a time from the end of a voice communication to the start of a next voice communication each time, may perform statistical analysis on such records, and may automatically set, as the predetermined time, a time which is expected that the possibility of the user performing again an outgoing call transmitting operation is high. For example, individual times from the end of communication to re-communication are acquired and statistically analyzed, and a time which covers equal to 80% or more of the re-communication is set as the predetermined time.

Second Embodiment

In the first embodiment, after a voice communication ends, the second wireless communication unit 102 maintains the state of acquiring of the communication system B until the predetermined time has elapsed. However, when it is obvious that a user does not perform voice communication again, it is desirable that a temporal withdrawal state of the communication system A should be immediately cancelled. An explanation will be given of an embodiment in which a temporal withdrawal state is terminated even if a predetermined time has not elapsed yet after a voice communication ends when it is determined that a user does not perform voice communication again.

Note that a configuration of a wireless communication system 10 and that of a wireless communication terminal 100 in the present embodiment are same as the respective configurations shown in FIG. 1 and FIG. 2.

Figure 6:
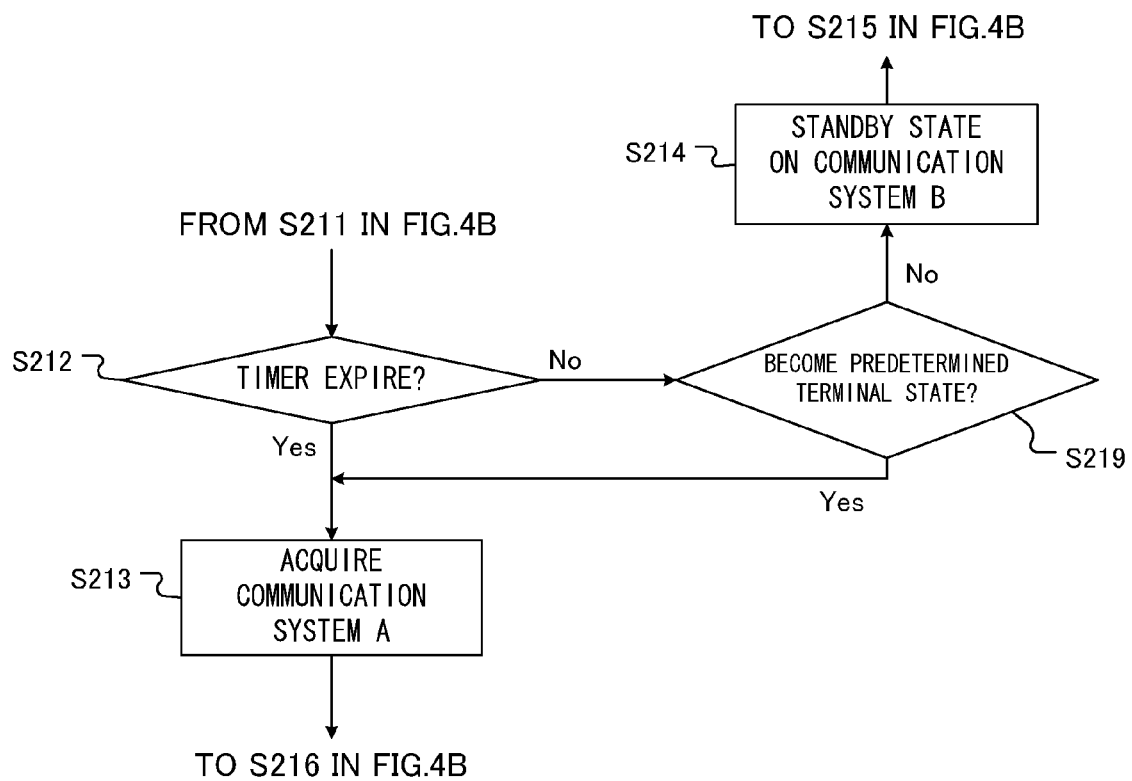
FIG. 6 is a flowchart showing a process flow of a wireless communication terminal according to a second embodiment of the present invention.

Moreover, basic operations of those system and terminal are substantially same as the respective operations explained with reference to FIGS. 4A, 4B, and FIG. 5, and an explanation will now be given of a characteristic part of an operation of the wireless communication terminal 100 with reference to FIG. 6.

In the present embodiment, a control unit 112 also executes the processes from step S200 to step S209 in FIGS. 4A and 4B, performs voice communication on a communication system B, and when detecting that the communication ends (S210; Yes), activates a timer (S211). While the timer which started measurement in step S211 does not expire (S212; No), the control unit 112 executes, based on a value detected by a terminal-state detection unit 109, a process of determining whether or not a user becomes a state of not performing voice communication again, more specifically, whether or not the wireless communication terminal 100 becomes a predetermined terminal state (S219). This determination process will be explained later. When it is determined that the wireless communication terminal 100 becomes the predetermined terminal state (S219; Yes), the wireless communication terminal 100 transitions the process to an acquiring process of a communication system A without waiting the expiration of the timer (S213). When it is determined that the wireless communication terminal 100 has not become the predetermined terminal state yet (S219; No), the wireless communication terminal 100 maintains a standby state on the communication system B (S214).

In this fashion, as the wireless communication terminal 100 remains in the standby state on the communication system B for a predetermined time after a voice communication on the communication system B ends, when the user performs an outgoing-call transmitting operation during the predetermined time, a time until a voice communication starts can be shortened. Moreover, even if the predetermined time has not elapsed yet, when a predetermined operation indicating that the user does not perform voice communication again is performed, more specifically, when a state of the wireless communication terminal 100 becomes a predetermined state, data communication on the communication system A can be quickly activated by causing the wireless communication terminal 100 to return to a standby state on the communication system A when a possibility of the user performing outgoing-call transmitting operation becomes low. This improves a user-friendliness.

An explanation will now be given of a specific example of the determination process in step S219.

For example, the wireless communication terminal 100 is a foldable type device having plural housings joined together by means of hinges and the terminal-state detection unit 109 is configured by a switch which detects an open/closed state of the wireless communication terminal 100. In this case, after a voice communication ends, if the wireless communication terminal 100 is folded, in general, it can be expected that a user has no intention of resuming a voice communication. Accordingly, when the terminal-state detection unit 109 and the wireless communication terminal 100 become a closed state, it is determined that the wireless communication terminal 100 becomes the predetermined terminal state through a predetermined operation by the user.

Moreover, for example, the wireless communication terminal 100 is a slide type device having plural housings slidably joined together and the terminal-state detection unit 109 is configured by a switch which detects a closed state in which the plural housings are overlapped so that the wireless communication terminal 100 becomes compact. In this case, when a voice communication ends, if the housings configuring the wireless communication terminal 100 are overlapped and closed, in general, it can be expected that a user has no intention of resuming a voice communication. Accordingly, when the terminal-state detection unit 109 and the wireless communication terminal 100 become a closed state, it is determined that the wireless communication terminal 100 becomes the predetermined terminal state. In those cases, when the terminal-state detection unit 109 detects that the wireless communication terminal 100 is closed, the control unit 112 gives an Yes determination, and causes the wireless communication terminal to execute the acquiring process of the communication system A.

In this fashion, as the wireless communication terminal 100 remains in the standby state on the communication system B for the predetermined time after the voice communication on the communication system B ends, when the user performs an outgoing-call transmitting operation during the predetermined time, a time until a voice communication starts can be shortened. Moreover, after the voice communication ends, when the wireless communication terminal 100 is closed even if the predetermined time has not elapsed yet, data communication on the communication system A can be quickly activated by causing the wireless communication terminal 100 to return to the standby state on the communication system A when a possibility of the user performing outgoing-call transmitting operation becomes low. Consequently, the user-friendliness can be improved.

Moreover, the predetermined terminal state can be set as a "state in which the wireless communication terminal 100 is stored from a bright place in a dark place". In this case, the terminal-state detection unit 109 comprises, for example, an optical sensor which detects brightness around the wireless communication terminal 100. In this case, when the terminal-state detection unit 109 detects that the brightness around the wireless communication terminal 100 changes from a brighter condition than a criterion to a darker condition, the control unit 112 gives the Yes determination in step S219, and causes the wireless communication terminal 100 to execute the acquiring process of the communication system A. The case in which the brightness around the wireless communication terminal 100 changes from the brighter condition than the criterion to the darker condition is, for example, a case in which the wireless communication terminal 100 is stored in a dark place, such as in a bag or in a pocket.

In this fashion, as the wireless communication terminal 100 remains in the standby state on the communication system B for the predetermined time after the voice communication on the communication system B ends, a time until a voice communication starts can be shortened when the user performs outgoing-call transmitting operation during the predetermined time. Moreover, when the wireless communication terminal 100 is stored in the bag or the like even if the predetermined time has not elapsed yet, data communication on the communication system A can be quickly activated by causing the wireless communication terminal 100 to return to the standby state on the communication system A when a possibility of the user performing outgoing-call transmitting operation becomes low. Consequently, the user-friendliness can be improved.

Moreover, the predetermined terminal state may be set as a "state in which the wireless communication terminal 100 is positioned at a stable place". In this case, the terminal-state detection unit 109 comprises, for example, an acceleration sensor or a contact sensor which detects a vibration of the wireless communication terminal 100 and a direction thereof. In this case, when the terminal-state detection unit 109 detects that a motion of the wireless communication terminal 100 becomes smaller than a predetermined largeness, the control unit 112 gives the Yes determination in step S219, and causes the wireless communication terminal 100 to execute the acquiring process of the communication system A. The case in which the motion of the wireless communication terminal 100 becomes smaller than the predetermined largeness is, for example, a case in which the wireless communication terminal 100 is positioned at a stable place, such as on a desk or a cradle.

In this fashion, as the wireless communication terminal 100 remains in the standby state on the communication system B for the predetermined time after the voice communication on the communication system B ends, a time until a voice communication starts can be shortened when the user performs outgoing-call transmitting operation during the predetermined time. Moreover, when the wireless communication terminal 100 is positioned on the desk or the like even if the predetermined time has not elapsed yet, data communication on the communication system A can be quickly activated by causing the wireless communication terminal 100 to return to the standby state on the communication system A when a possibility of the user performing outgoing-call transmitting operation becomes low, so that the user-friendliness can be improved.

Moreover, the predetermined terminal state may be set as a "state in which a predetermined application of the wireless communication terminal 100 is launched". In this case, the terminal-state detection unit 109 comprises, for example, a program or the like which acquires launched statuses of respective various applications of the wireless communication terminal 100. In this case, when the terminal-state detection unit 109 detects that the predetermined application program stored in a memory unit 107 of the wireless communication terminal 100 is launched, the control unit 112 gives the Yes determination in step S219, and causes the wireless communication terminal 100 to execute the acquiring process of the communication system A. The predetermined application program is an application irrelevant to a voice communication, and is, for example, an application program of a camera, an application program of a television, an application program of a browser, and an application program of an e-mail. Note that the same is true of a case in which an instruction of cancelling the standby state on the communication system B is explicitly given through a user operation. Moreover, the term "launching of the application program" here includes not only launching of an application program from the start, but also resuming of running of an application program which has been interrupted with the voice communication starting instruction in step S202 being as a trigger, and starting of an operation of an application program which has operated in the background.

In this fashion, as the wireless communication terminal 100 remains in the standby state on the communication system B for the predetermine time after the voice communication on the communication system B ends, a time until a voice communication starts can be shortened when the user performs outgoing-call transmitting operation during the predetermined time. Moreover, when the application irrelevant to a voice communication is launched even if the predetermined time has not elapsed yet, data communication on the communication system A can be quickly activated by causing the wireless communication terminal 100 to return to the standby state on the communication system A when a possibility of the user performing outgoing-call transmitting operation becomes low, so that the user-friendliness can be improved.

Note that the "predetermined terminal state" is not limited to the above-exemplified states. Moreover, it is fine if the above-exemplified states are combined together in any way and used. For example, when it is detected in step S219 that the wireless communication terminal 100 is closed or when it is detected that the surrounding environment of the wireless communication terminal 100 changes from bright to dark, the process may transition to the acquiring process of the communication system A.

Third Embodiment

In the foregoing first embodiment and the foregoing second embodiment, after a voice communication ends, when the certain period has elapsed, the communication system B is released. However, when the user is performing such predetermined action as preparing for a next voice communication, it is rather efficient to cause the wireless communication terminal 100 to keep acquiring the communication system B. An explanation will be given of a third embodiment in which the wireless communication terminal 100 keeps acquiring a communication system B when a user is preparing for a voice communication.

Note that a configuration of a wireless communication system 10 and that of a wireless communication terminal 100 in the present embodiment are same as the respective configurations shown in FIG. 1 and FIG. 2.

Figure 7:
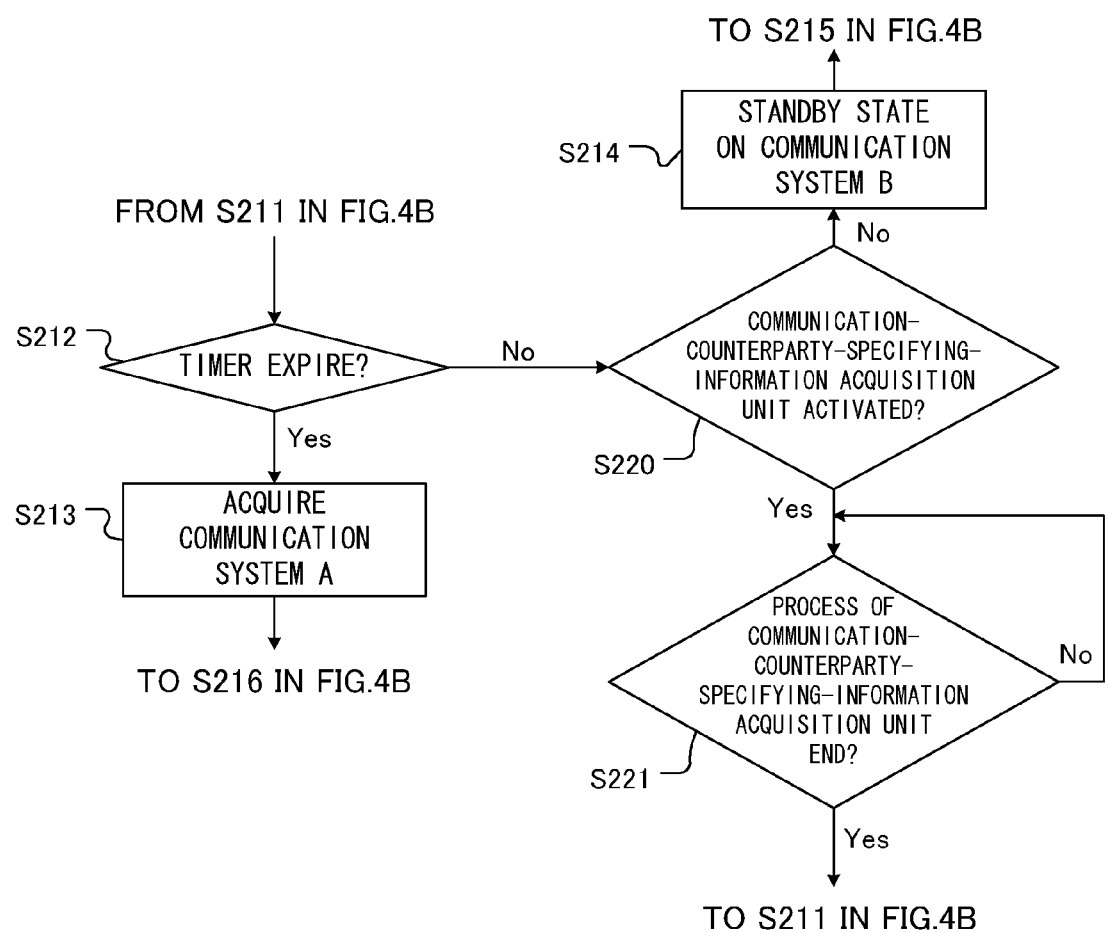
FIG. 7 is a flowchart showing a process flow of a wireless communication terminal according to a third embodiment of the present invention.

Moreover, basic operations of those system and terminal are substantially same as the respective operations explained with reference to FIGS. 4A, 4B, and FIG. 5, and an explanation will now be given of a characteristic part of an operation of the wireless communication terminal 100 with reference to FIG. 7.

In the present embodiment, a control unit 112 also executes the processes from step S200 to step S209 in FIGS. 4A and 4B and performs voice communication on a communication system B. When detecting that the communication ends (S210; Yes), the control unit 112 activates a timer (S211).

While the timer which started measurement in step S211 does not expire (S212; No), the control unit 112 executes a process of determining whether or not a communication-counterparty-specifying-information acquisition unit 111 is activated (S220). A state in which the communication-counterparty-specifying-information acquisition unit 111 is activated is a state in which a user took a predetermined action that is any one of or a combination of, for example, a state in which a telephone book (an address book) function is activated, a state in which an input of an outgoing-call telephone number is initiated through a user operation, and a state in which the wireless communication terminal 100 accesses a telephone number database function and the like on the Web. When it is determine that the communication-counterparty-specifying-information acquisition unit 111 is activated (S220; Yes), the wireless communication terminal 100 waits until an activated process of the communication-counterparty-specifying-information acquisition unit 111 ends (S221). When the process of the communication-counterparty-specifying-information acquisition unit 111 ends (S221; Yes), the process returns to step S211 in FIG. 4B, and a timer is reset and restarts measurement. When it is determined that the communication-counterparty-specifying-information acquisition unit 111 is not activated (S220; No), the wireless communication terminal 100 maintains a standby state on the communication system B (S214).

In this fashion, when the telephone book function or the like is activated before a predetermined time has elapsed after a voice communication ends, as the wireless communication terminal 100 remains in the standby state on the communication system B until a process of the telephone book function or the like ends, a time until a voice communication starts can be shortened when the user performs outgoing-call transmitting operation while the communication terminal 100 remains in the standby state on the communication system B, thereby improving a user-friendliness.

Note that not only when the communication-counterparty-information acquisition unit is activated and when communication-counterparty information is acquired, but also when a predetermined action which is expected that the user has started a process for a voice communication is detected, e.g., when it is detected that a headset is connected to the wireless communication terminal 100, the process may return to step S211 in FIG. 4B. In this fashion, a time until a voice communication starts can be shortened when the user performs an outgoing-call transmitting operation, so that the user-friendliness can be improved.

Fourth Embodiment

Depending on contents of a voice communication which has ended and a kind thereof, there is a case in which a possibility of a user resuming a voice communication is little, and it is more effective to quickly shift a state to a state in which a communication system A is acquired than to maintain a state in which a communication system B is acquired. An explanation will be given of a fourth embodiment which copes with such case.

Note that a configuration of a wireless communication system 10 and that of a wireless communication terminal 100 in the present embodiment are same as the respective configurations shown in FIG. 1 and FIG. 2.

Figure 8:
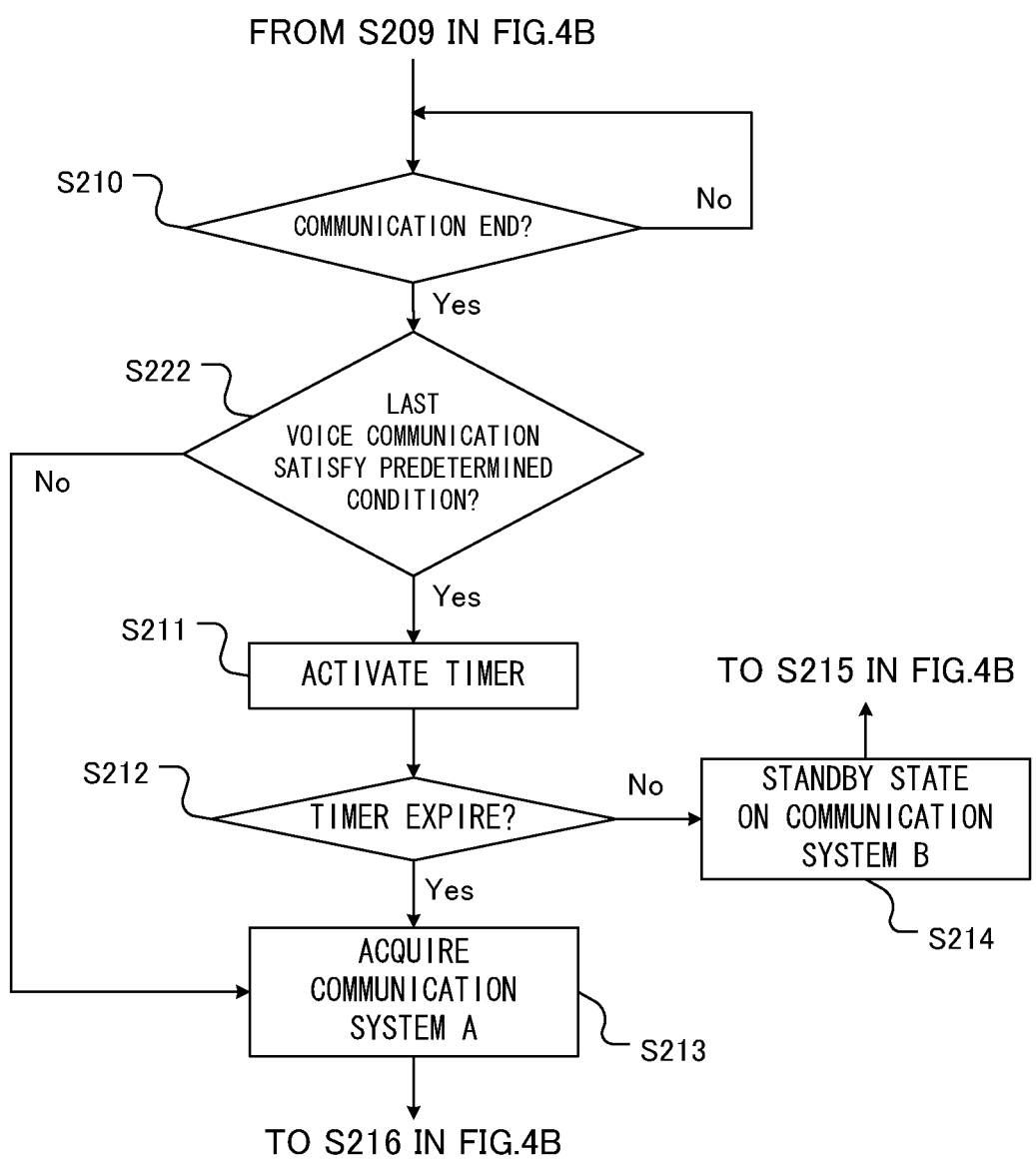
FIG. 8 is a flowchart showing a process flow of a wireless communication terminal according to a fourth embodiment of the present invention.

Moreover, basic operations of those system and terminal are substantially same as the respective operations explained with reference to FIGS. 4A, 4B, and FIG. 5, and an explanation will now be given of a characteristic part of an operation of the wireless communication terminal 100 with reference to FIG. 8.

In the present embodiment, a control unit 112 also executes the processes from step S200 to step S209 in FIGS. 4A and 4B and performs voice communication on a communication system B. When detecting that the communication ends (S210; Yes), the control unit 112 acquires information related to a wireless communication performed by a second wireless communication unit 102 via a second wireless-communication-related-information acquisition unit 110, and the control unit 112 executes, based on the acquired information, a process of determining whether or not a last voice communication satisfies a predetermined condition (S222). This determination process will be explained later.

In step S222, when it is determined that the predetermined condition is satisfied (S222; Yes), a timer management unit 108 causes a timer to start clocking (S211). When a predetermined time has elapsed and the timer expires (S212; Yes), an acquiring process of a communication system A is executed (S213). Conversely, while the timer does not expire (S212; No), the wireless communication terminal 100 maintains a standby state on the communication system B (S214).

Conversely, when it is determined in the determination process at step S222 that the predetermined condition is not satisfied (S222; No), the acquiring process of the communication system A is immediately executed (S213).

In this fashion, after a voice communication on the communication system B ends, a time until a voice communication starts can be shortened when a user performs an outgoing-call transmitting operation during the predetermined time by causing the wireless communication terminal 100 to immediately return to a standby state on the communication system A under normal conditions and to become able to quickly activate data communication on the communication system A, and by causing the wireless communication terminal 100 to remain in the standby state on the communication system B during the predetermined time only when the predetermined condition is satisfied. This improves a user-friendliness.

An explanation will now be given of a specific example of the determination process in step S222.

An example corresponding to the predetermined condition is a "case in which a communication counterparty of a last voice communication is a voice mail network service". In this case, when a user makes a call to the voice mail network service and after a communication therewith ends, the possibility of the user immediately making redialing to a communication counterparty who left a voice mail message is high. Accordingly, the wireless communication terminal 100 maintains the standby state on the communication system B during the predetermined time. In other cases, the wireless communication terminal 100 immediately returns to the standby state on the communication system A. Another example is a "case in which a last communication counterparty is a member of a group which has been registered beforehand and which often makes calls with a user". In this case, if the user makes a call to one of the group members and after a communication with that member ends, the possibility of the user immediately making redialing to another member of the group is high. Accordingly, the wireless communication terminal 100 maintains the standby state on the communication system B during the predetermined time. In other cases, the wireless communication terminal 100 immediately returns to the standby state on the communication system A.

In order to realize these processes, for example, the second wireless-communication-related-information acquisition unit 110 has a function of storing communication-counterparty information when the second wireless communication unit 102 transmits an outgoing-call, a function of storing communication-counterparty information subjected to notification from a wireless communication base station in the case of an incoming-call, and a function of reading those pieces of information. Moreover, information on a specific communication counterparty is stored in the memory unit 107 beforehand. In the step S222, the control unit 112 determines whether or not information acquired by the second wireless-communication-related-information acquisition unit 110 matches the specific-communication-counterparty information stored in the memory unit 107. When those pieces of information are consistent with each other, it is determined that a last voice communication satisfies the predetermined condition.

In this fashion, after the voice communication on the communication system B ends, a time until a voice communication starts can be shortened when the user performs outgoing-call transmitting operation during the predetermined time by causing the wireless communication terminal 100 to immediately return to the standby state on the communication system A under normal conditions and to become able to quickly activate data communication on the communication system A, and by causing the wireless communication terminal 100 to remain in the standby state on the communication system B during the predetermined time only when a communication with a specific communication counterparty ends. This improves the user-friendliness.

For example, it may be determined that the predetermined condition is satisfied when the voice communication cannot start normally in step S209 in FIG. 4B. In this case, if the voice communication in step S209 does not come into effect, the possibility of a user immediately making redialing to the same communication counterparty or making redialing to another communication counterparty is high, so that the wireless communication terminal 100 maintains the standby state on the communication system B during the predetermined time. In other cases, the wireless communication terminal 100 immediately returns to the standby state on the communication system A. In this case, the second wireless-communication-related-information acquisition unit 110 is a processing unit having a function of storing a result of an outgoing-call transmitting process by the second wireless communication unit 102, a function of reading the stored result and the like. The control unit 112 determines that a last voice communication satisfies the predetermined condition when information on the voice communication result acquired by the second wireless-communication-related-information acquisition unit 110 indicates a failure of a voice communication, and progresses the process to step S211, and the wireless communication terminal 100 maintains the standby state on the communication system B during the predetermined time. In other cases, the wireless communication terminal 100 immediately returns to the standby state on the communication system A.

In this fashion, after the voice communication on the communication system B ends, a time until a voice communication starts can be shortened when the user performs an outgoing-call transmitting operation during the predetermined time by causing the wireless communication terminal 100 to immediately return to the standby state on the communication system A under normal conditions and to become able to quickly activate data communication on the communication system A, and by causing the wireless communication terminal 100 to remain in the standby state on the communication system B during the predetermined time only when the last voice communication is not satisfied. This improves the user-friendliness.

Moreover, when the voice communication in step S209 does not end normally, it may be determined in step S222 that the last voice communication satisfies the "predetermined condition". When the voice communication does not end normally, the possibility of the user immediately making redialing to the same communication counterparty is high. Accordingly, when the voice communication does not end normally, the wireless communication terminal 100 maintains the standby state on the communication system B during the predetermined time. In other cases, the wireless communication terminal 100 immediately returns to the standby state on the communication system A. In this case, the second wireless-communication-related-information acquisition unit 110 comprises a processing unit having a function of acquiring and storing a radio wave condition when the second wireless communication unit 102 terminates a communication, a function of reading the stored radio wave condition and the like, or a processing unit having a function of storing information indicating whether or not a notification that the communication normally ended is received from the wireless communication base station, a function of reading the information and the like, or a processing unit having a function of monitoring a communication status (a state in which a voice communication continues, or a silent state) of the second wireless communication unit 102, a function of storing the communication status when the communication ends, and a function of reading the stored communication status and the like, etc. Moreover, when information on an end state of a voice communication acquired by the second wireless-communication-related-information acquisition unit 110 indicates that the communication did not end normally, the control unit 112 determines in step S222 that the last voice communication satisfies the predetermined condition, and the wireless communication terminal 100 maintains the standby state on the communication system B during the predetermined time. In other cases, the wireless communication terminal 100 immediately returns to the standby state on the communication system A.

In this fashion, after the voice communication on the communication system B ends, a time until a voice communication starts can be shortened when the user performs an outgoing-call transmitting operation during the predetermined time by causing the wireless communication terminal 100 to immediately return to the standby state on the communication system A under normal conditions and to become able to quickly activate data communication on the communication system A, and by causing the wireless communication terminal 100 to remain in the standby state on the communication system B during the predetermined time only when the last voice communication abnormally ended. This improves the user-friendliness.

Note that the foregoing conditions in which it is determined that a last voice communication satisfies the predetermined condition are just examples, and it is fine if other conditions are set or the foregoing conditions are combined together accordingly. For example, when any one of a case in which a communication counterparty of a last voice communication has been registered beforehand, a case in which the voice communication did not start normally, and a case in which the voice communication did not end normally is satisfied, it may be determined that the last voice communication satisfies the predetermined condition.

Fifth Embodiment

Figure 9:
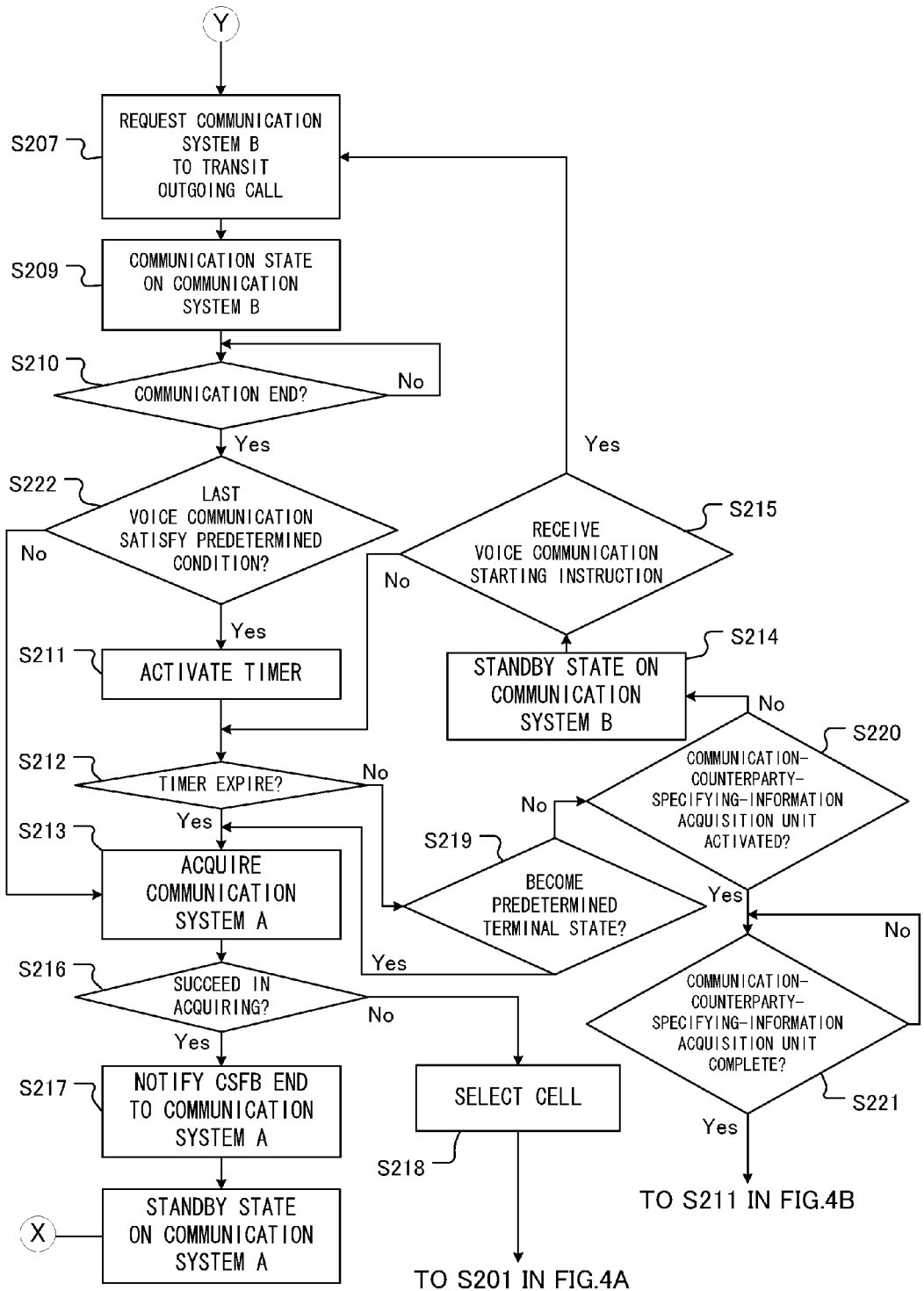
FIG. 9 is a flowchart showing a process flow of a wireless communication terminal according to a fifth embodiment of the present invention.

An explanation will be given of an operation of a wireless communication terminal 100 having all of the respective functions of the foregoing second to fourth embodiments with reference to a flowchart in FIG. 9.

Note that a configuration of a wireless communication system 10 and that of a wireless communication terminal 100 in the present embodiment are same as the respective configurations shown in FIG. 1 and FIG. 2.

First, in the present embodiment, a control unit 112 also executes the processes from step S200 to step S209 in FIGS. 4A and 4B and performs voice communication on a communication system B.

Next, when detecting that the communication ends (S210; Yes), the control unit 112 acquires information related to a wireless communication performed by a second wireless communication unit 102 via a second wireless-communication-related-information acquisition unit 110, and the control unit 112 executes, based on the acquired information, a process of determining whether or not a last voice communication satisfies a predetermined condition (S222).

When it is determined that the last voice communication does not satisfy the predetermined condition in a case in which a communication counterparty is not a specific communication counterparty and the voice communication was normally started and ended (S222; No), an acquiring process of a communication system A is immediately executed (S213).

Conversely, when it is determined that the last voice communication satisfies the predetermined condition because the communication counterparty is the specific communication counterparty, or the voice communication did not start normally, or the voice communication did not end normally, etc., (S222; Yes), the control unit 112 causes a timer management unit 108 to start clocking by means of a timer (S211). When the timer expires (S212; Yes), the acquiring process of the communication system A is executed (S213).

Conversely, while the timer which started measurement in the step S211 does not expire (S212; No), the control unit 112 executes a process of determining whether or not the user took an action indicating that a voice communication is not performed again, e.g., whether or not the wireless communication terminal 100 becomes a predetermined terminal state based on a value detected by a terminal-state detection unit 109 (S219). When it is determined that the wireless communication terminal 100 becomes the predetermined terminal state (S219; Yes), the wireless communication terminal 100 transitions the process to the acquiring process of the communication system A without waiting the expiration of the timer (S213). When it is determined that the wireless communication terminal 100 has not become the predetermined terminal state yet (S219; No), the control unit 112 executes a process of determining whether or not the user has started preparation for a voice communication, e.g., whether or not a communication-counterparty-specifying-information acquisition unit 111 is activated (S220). When it is determine that the communication-counterparty-specifying-information acquisition unit 111 is activated (S220; Yes), the wireless communication terminal 100 waits until an activated process of the communication-counterparty-specifying-information acquisition unit 111 ends (S221). When the process of the communication-counterparty-specifying-information acquisition unit 111 ends (S221; Yes), the process returns to step S211, and the timer is reset and restarts measurement. When it is determined that the communication-counterparty-specifying-information acquisition unit 111 is not activated (S220; No), the wireless communication terminal 100 maintains a standby state on the communication system B (S214).

When a voice communication starting instruction is received (S215; Yes), the process returns to step S207, and an outgoing-call transmitting request is transmitted to a cell on the communication system B. When no voice communication starting instruction is received (S215; No), the process returns to a process of determining whether or not the timer has expired (S212). Note that the order of the determination process in step S219 and the determination process in step S220 may be reversed.

Through the foregoing processes, a time until a voice communication starts can be shortened when a voice communication operation is successively performed, and the user-friendliness can be improved. Moreover, during such operation, it becomes unnecessary to transmit a CSFB end notification in step S217 and a CSFB starting notification in step S203, so that a wireless resource can be also saved.

Note that the present invention is not limited to the foregoing embodiments, and it is obvious that various changes and modifications which can be made within the spirit and scope of the present invention are included in the present invention. For example, the configuration of the wireless communication system and the functional configuration of the wireless communication terminal shown in FIG. 1 and FIG. 2, respectively, may include other structural elements than the illustrated structural elements, and may differ from those configurations shown in FIG. 1 and FIG. 2 in some cases. For example, the timer management unit 108, the second wireless-communication-related-information acquisition unit 110, the communication-counterparty-specifying-information acquisition unit 111 and the like may be a part of the function of the control unit 112. Moreover, the condition of the terminal state of the terminal-state detection unit 109, the predetermined condition of the second wireless-communication-related-information acquisition unit 110 and the like can be combined together in various ways so as to be a continuous condition of an acquiring state of a voice communication system.

It is not necessary that the foregoing first to fifth embodiments are all combined together, and those embodiments can be combined accordingly and applied. Moreover, an operation control program for causing the control unit 112 to execute the above-explained operations can be recorded in a recording medium and distributed, distributed over a network, or stored in the memory unit 107 for example.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A wireless communication terminal comprising:
   a first wireless communication unit which performs data communication via a first wireless communication system in a first wireless communication scheme;
   a second wireless communication unit which performs voice communication via a second wireless communication system in a second wireless communication scheme enabling a voice communication; and
   a control unit which controls the first wireless communication unit and the second wireless communication unit,
   wherein
   the control unit causes the first wireless communication unit to execute a temporal withdrawal process to the first wireless communication system, and causes the second wireless communication unit to execute an acquiring process of the second wireless communication system when an instruction of starting a voice communication is given,
   causes the second wireless communication unit to continue an acquiring state of the second wireless communication system when a predetermined condition is satisfied after the voice communication ends,
   causes the second wireless communication unit to continue the acquiring state of the second wireless communication system until a predetermined time elapses after the voice communication ends, and
   causes the second wireless communication unit to cancel the acquiring state of the second wireless communication system, and causes the first wireless communication unit to start a temporal withdrawal cancelling process to the first wireless communication system after the predetermined time has elapsed.

2. The wireless communication terminal according to claim 1, further comprising a detection unit,
   wherein the control unit cancels the acquiring state of the second wireless communication system by the second wireless communication unit, and causes the first wireless communication unit to start the temporal withdrawal cancelling process to the first wireless communication system when the detection unit detects a predetermined terminal state until the predetermined time elapses after the voice communication ends.

3. The wireless communication terminal according to claim 2, wherein
   the detection unit comprises a unit which detects an open/closed state of the wireless communication terminal, and
   the control unit cancels the acquiring state of the second wireless communication system by the second wireless communication unit, and causes the first wireless communication unit to start the temporal withdrawal cancelling process to the first wireless communication system when the detection unit detects a closed state of the wireless communication terminal until the predetermined time elapses after the voice communication ends.

4. The wireless communication terminal according to claim 2, wherein
   the detection unit comprises a unit which detects brightness around the wireless communication terminal, and
   the control unit cancels the acquiring state of the second wireless communication system by the second wireless communication unit, and causes the first wireless communication unit to start the temporal withdrawal cancelling process to the first wireless communication system when the detection unit detects that the brightness around the wireless communication terminal becomes equal to a reference level or less until the predetermined time elapses after the voice communication ends.

5. The wireless communication terminal according to claim 2, wherein
   the detection unit comprises a unit which detects a motion of the wireless communication terminal, and
   the control unit cancels the acquiring state of the second wireless communication system by the second wireless communication unit, and causes the first wireless communication unit to start the temporal withdrawal cancelling process to the first wireless communication system when the detection unit detects that the motion of the wireless communication terminal becomes equal to a reference level or less until the predetermined time elapses after the voice communication ends.

6. The wireless communication terminal according to claim 2, wherein
the detection unit comprises a unit which detects a launched state of a predetermined application program of the wireless communication terminal, and
the control unit causes the second wireless communication unit to cancel the acquiring state of the second wireless communication system, and causes the first wireless communication unit to start the temporal withdrawal cancelling process to the first wireless communication system when the detection unit detects that the predetermined application program is launched until the predetermined time elapses after the voice communication ends.

7. The wireless communication terminal according to claim 2, wherein
the detection unit comprises a unit which detects a predetermined operation given by a user, and
the control unit causes the second wireless communication unit to cancel the acquiring state of the second wireless communication system, and causes the first wireless communication unit to start the temporal withdrawal cancelling process to the first wireless communication system when the detection unit detects the predetermined operation until the predetermined time elapses after the voice communication ends.

8. The wireless communication terminal according to claim 1, further comprising a communication-counterparty-specifying-information acquisition unit which acquires information on a communication counterparty,
wherein when the communication-counterparty-specifying-information acquisition unit is activated before the predetermined time elapses,
the control unit causes the second wireless communication unit to continue the acquiring state of the second wireless communication system until the communication-counterparty-specifying-information acquisition unit completes a process.

9. The wireless communication terminal according to claim 1, wherein
the detection unit comprises a unit which detects a predetermined action taken by a user, and
the control unit causes the second wireless communication unit to continue the acquiring state of the second wireless communication system when the detection unit detects the predetermined action taken by the user before the predetermined time elapses.

10. A wireless communication terminal comprising:
a first wireless communication unit which performs data communication via a first wireless communication system in a first wireless communication scheme;
a second wireless communication unit which performs voice communication via a second wireless communication system in a second wireless communication scheme enabling a voice communication; and
a control unit which controls the first wireless communication unit and the second wireless communication unit, wherein
the control unit causes the first wireless communication unit to execute a temporal withdrawal process to the first wireless communication system, and causes the second wireless communication unit to execute an acquiring process of the second wireless communication system when an instruction of starting a voice communication is given, and
causes the second wireless communication unit to continue an acquiring state of the second wireless communication system when a predetermined condition is satisfied after the voice communication ends,
the control unit comprises a second wireless-communication-related-information acquisition unit which acquires information related to a voice communication performed by the second wireless communication unit, and
the control unit causes the second wireless communication unit to execute a process of continuing the acquiring state of the second wireless communication system based on the information acquired by the second wireless-communication-related-information acquisition unit, after the voice communication ends, or
the control unit causes the second wireless communication unit to cancel the acquiring state of the second wireless communication system, and causes the first wireless communication unit to execute a process of starting a temporal withdrawal cancelling process to the first wireless communication system based on the information acquired by the second wireless-communication-related-information acquisition unit, after the voice communication ends.

11. The wireless communication terminal according to claim 10, wherein
the information acquired by the second wireless-communication-related-information acquisition unit includes communication-counterparty information indicating a communication counterparty of the voice communication.

12. The wireless communication terminal according to claim 10, wherein
the information acquired by the second wireless-communication-related-information acquisition unit includes information indicating a success or a failure of the voice communication.

13. The wireless communication terminal according to claim 10, wherein
the information acquired by the second wireless-communication-related-information acquisition unit is information including an end state of the voice communication.

* * * * *